(12) United States Patent
Lan

(10) Patent No.: US 6,581,957 B1
(45) Date of Patent: Jun. 24, 2003

(54) FOLDABLE STROLLER

(76) Inventor: Red Lan, 15F, No. 108, Sec. 1, Hsin Tai 5th Rd., Hsichih, Taipei Hsien (TW)

( * ) Notice: Subject to any disclaimer, the term of this patent is extended or adjusted under 35 U.S.C. 154(b) by 0 days.

(21) Appl. No.: 10/081,549

(22) Filed: Feb. 20, 2002

(51) Int. Cl.[7] .................................................. B62B 7/10
(52) U.S. Cl. ..................... 280/642; 280/647; 280/47.38
(58) Field of Search ................................. 280/642, 647, 280/650, 47.25, 47.38, 47.39, 47.4, 657; 397/46, 48

(56) References Cited

U.S. PATENT DOCUMENTS

| | | | | |
|---|---|---|---|---|
| 4,741,551 A | * | 5/1988 | Perego | 280/642 |
| 5,478,102 A | * | 12/1995 | Haung | 280/642 |
| 5,513,864 A | * | 5/1996 | Huang | 280/642 |
| 5,622,377 A | * | 4/1997 | Shamie | 280/642 |
| 5,645,293 A | * | 7/1997 | Cheng | 280/642 |
| 5,725,238 A | * | 3/1998 | Huang | 280/642 |
| 5,938,229 A | * | 8/1999 | Chen et al. | 280/642 |
| 6,062,588 A | * | 5/2000 | Cheng | 280/642 |
| 6,073,945 A | * | 6/2000 | Cheng | 280/642 |
| 6,135,487 A | * | 10/2000 | Flannery et al. | 280/642 |
| 6,152,476 A | * | 11/2000 | Huang | 280/642 |
| 6,361,056 B1 | * | 3/2002 | Chen et al. | 280/642 |
| 6,416,076 B1 | * | 7/2002 | Hou et al. | 280/642 |
| 6,447,001 B1 | * | 9/2002 | Hsia | 280/642 |
| 6,464,244 B1 | * | 10/2002 | Cheng | 280/642 |
| 6,478,327 B1 | * | 11/2002 | Hartenstine et al. | 280/642 |

* cited by examiner

Primary Examiner—Brian L. Johnson
Assistant Examiner—Jeffrey J Restifo
(74) Attorney, Agent, or Firm—Renner, Otto, Boisselle & Sklar, LLP

(57) ABSTRACT

A foldable stroller includes a main frame with two front legs and two suspending rods pivoted, to the front legs to be turnable between folded and unfolded positions. Two handle rods are pivoted to two linking levers which are mounted pivotally to the suspending rods so as to be turnable relative to the main frame. A guarding rail has two pivoted ends pivoted to the handle rods. A backrest frame has two lower stile ends pivoted to the linking levers. A holding member is secured to the guarding rail and the backrest frame. Thus, when the handle rods are pushed forward, downward movement of the guarding rail induces a force to the holding member so as to fold the backrest frame.

6 Claims, 12 Drawing Sheets

FOLDABLE STROLLER

BACKGROUND OF THE INVENTION

1. Field of the Invention

This invention relates to a foldable stroller, more particularly to a foldable stroller with a backrest frame which can be concurrently folded during a folding operation of the stroller.

2. Description of the Related Art

A conventional foldable stroller includes a main frame with front and rear legs which are provided respectively with two front wheels and two rear wheels, and a seat frame, a backrest frame, and a handle frame mounted pivotally on the main frame so as to be folded to be disposed close to the main frame. In addition, the backrest frame is disposed to be turnable to a desired inclined position relative to the seat frame. However, since the backrest frame is maintained in the position when the stroller is folded, a separate folding operation of the backrest frame is needed, thereby resulting in inconvenience during folding of the stroller.

SUMMARY OF THE INVENTION

The object of the present invention is to provide a foldable stroller in which a backrest frame thereof can be concurrently folded during a folding operation of the stroller.

According to this invention, the foldable stroller includes a pair of front legs spaced apart from each other in an axial direction. Each front leg includes a front lower end to carry a front wheel, a front upper end opposite to the front lower end in a transverse direction transverse to the axial direction, and an intermediate portion interposed therebetween. A suspending rod has a front securing end pivotally mounted to the front upper end about a first axis, and a middle support portion extending from the front securing end rearward and downwardly to terminate at a rear holding end which carries a rear wheel. A stump includes a connected end pivotally mounted to the front securing end about a second axis parallel to the first axis, and an upright portion extending from the connected end in the transverse direction and uprightly to terminate at a rest end. Thus, the front leg and the respective stump are turnable about the first and second axes respectively to transform the stroller between a folded position, where the front lower end and the rest end are closer to the middle support portion, and an unfolded position, where the front lower end and the rest end are remote from the middle support portion.

A mounting bar includes an anchoring end connected to the intermediate portion, and a mount portion extending rearward from the anchoring end to terminate at a rearmost end. A linking lever has a fulcrum pivoted to the mounting portion about a third axis parallel to the second axis, a weight end pivoted to the middle support portion, and a coupling joint disposed at the opposite side of the fulcrum. As such, the coupling joint is turned about the third axis to move closer to the rearmost end when the foldable stroller is transformed from the unfolded position to the folded position. The coupling joint includes a pivoted area, upper and lower barrier walls extending in the axial direction and on the opposite sides of the pivoted area in the transverse direction, and a guiding path extending between the upper and lower barrier walls and disposed forwardly of the pivoted area.

A handle rod includes a rider end disposed to rest on the middle support portion when the stroller is in the unfolded position, an anchoring segment extending from the rider end upwardly and pivotally mounted on the pivoted area about a fourth axis which is parallel to the third axis, a lower arm extending from the anchoring segment upwardly, and an upper arm extending from the lower arm and distal to the anchoring segment. A locking coupler is provided with a locking portion, and is movable relative to the lower arm between a locked position, where the locking portion is hindered by the upper barrier wall from moving forward, thereby preventing turning of the upper and lower arms, and a released position, where the locking portion is disengaged from the upper barrier wall, thereby permitting the turning of the upper and lower arms to be closer to the front securing end. An actuator is disposed to actuate the locking coupler to move away from the anchoring segment so as to place the locking coupler in the released position. A biasing member is disposed to bias the locking coupler to move towards the anchoring segment.

A guarding rail includes left and right side rail portions, each having a front end supported by the rest end, and a rear end extending rearwardly from the front end to terminate at a respective one of left and right pivoted ends. Each of the left and right pivoted ends is pivotally connected to the lower arm about a fifth axis parallel to the fourth axis and proximate to the upper arm.

A backrest frame includes a pair of stiles spaced apart from each other in the axial direction and inboard to the handle rod. Each stile includes a lower stile end pivotally mounted to the pivoted area and turnable about the fourth axis, an upper stile end opposite to the lower stile end, and an intermediate stile segment interposed between the upper and lower stile ends.

A holding member has first and second connected ends respectively secured to one of the stump and the guarding rail, and the intermediate stile segment. Thus, when the upper and lower arms are pushed forward and are turned about the fourth axis while the locking couplers are in the released position, downward movement of a respective one of the left and right side rail portions, which arises as a result of pivoting movements of the lower arm and the stump, induces a jerk force to the holding member, thereby bringing the upper stile end to turn about the fourth axis and to fall down together with the upper arm by virtue of gravity.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
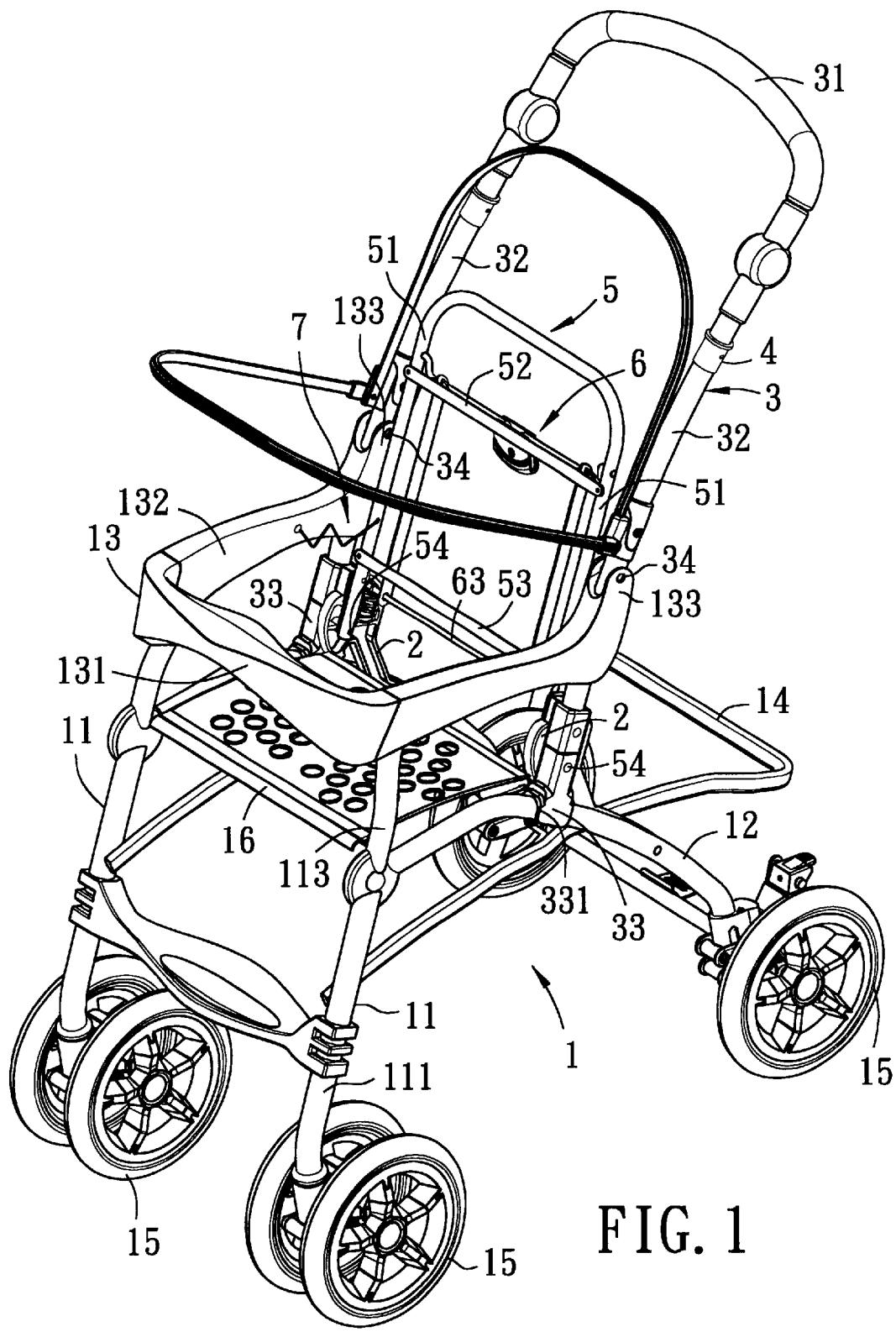
FIG. 1 is a perspective view of a preferred embodiment of a foldable stroller according to this invention in an unfolded state.
Figure 2:
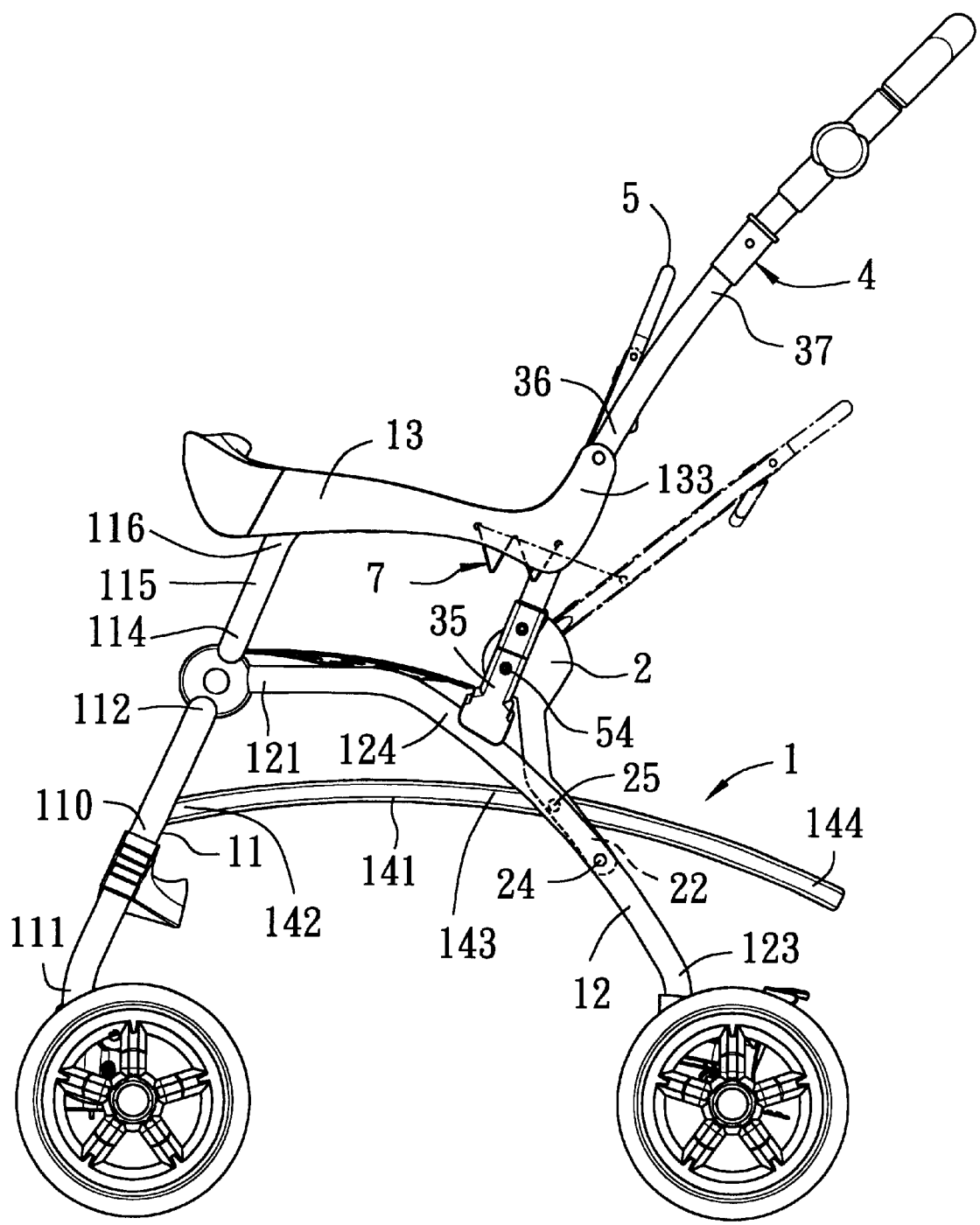
FIG. 2 is a side view of the embodiment shown in FIG. 1.

Referring to FIGS. 1 and 2, the preferred embodiment of the foldable stroller according to the present invention is shown to comprise a main frame 1, a pair of linking levers 2, a handle frame 3, a guarding rail 13, a backrest frame 5, a position locking mechanism 6, and a pair of holding members 7.

The main frame 1 includes a pair of front legs 11 spaced apart from each other in an axial direction. Each front leg 11 includes a front lower end 111 to carry a front wheel 15, a front upper end 112 opposite to the front lower end 111 in a transverse direction transverse to the axial direction, and an intermediate portion 110 interposed therebetween. A pair of suspending rods 12 are spaced apart from each other in the axial direction. Each suspending rod 12 has a front securing end 121 which is pivotally mounted to the front upper end 112 about a first axis, and a middle support portion 124 which extends from the front securing end 121 rearward and downwardly and which terminates at a rear holding end 123 to carry a rear wheel 15. A seat plate 16 is mounted between the intermediate portions 110 and the middle support portions 124. Each of two stumps 113 includes a connected end 114 which is pivotally mounted to a respective front securing end 121 about a second axis parallel to the first axis, and an upright portion 115 which extends from the connected end 114 in the transverse direction and uprightly and which terminates at a rest end 116. Thus, with reference to FIGS. 2, 8, 10 and 12, the front leg 11 and the stump 113 are turnable about the first and second axes respectively to transform the stroller between a folded position, where the front lower end 111 and the rest end 116 are closer to the middle support portion 124, and an unfolded position, where the front lower end 111 and the rest end 116 are remote from the middle support portion 124. A mounting frame 14 includes a pair of mounting bars 141, each of which has an anchoring end 142 connected to the intermediate portion 110, and a mount portion 143 extending rearward from the anchoring end 142 and terminating at a rearmost end 144. The rearmost ends 144 of the mounting frame 14 are connected to each other.

Figure 3:
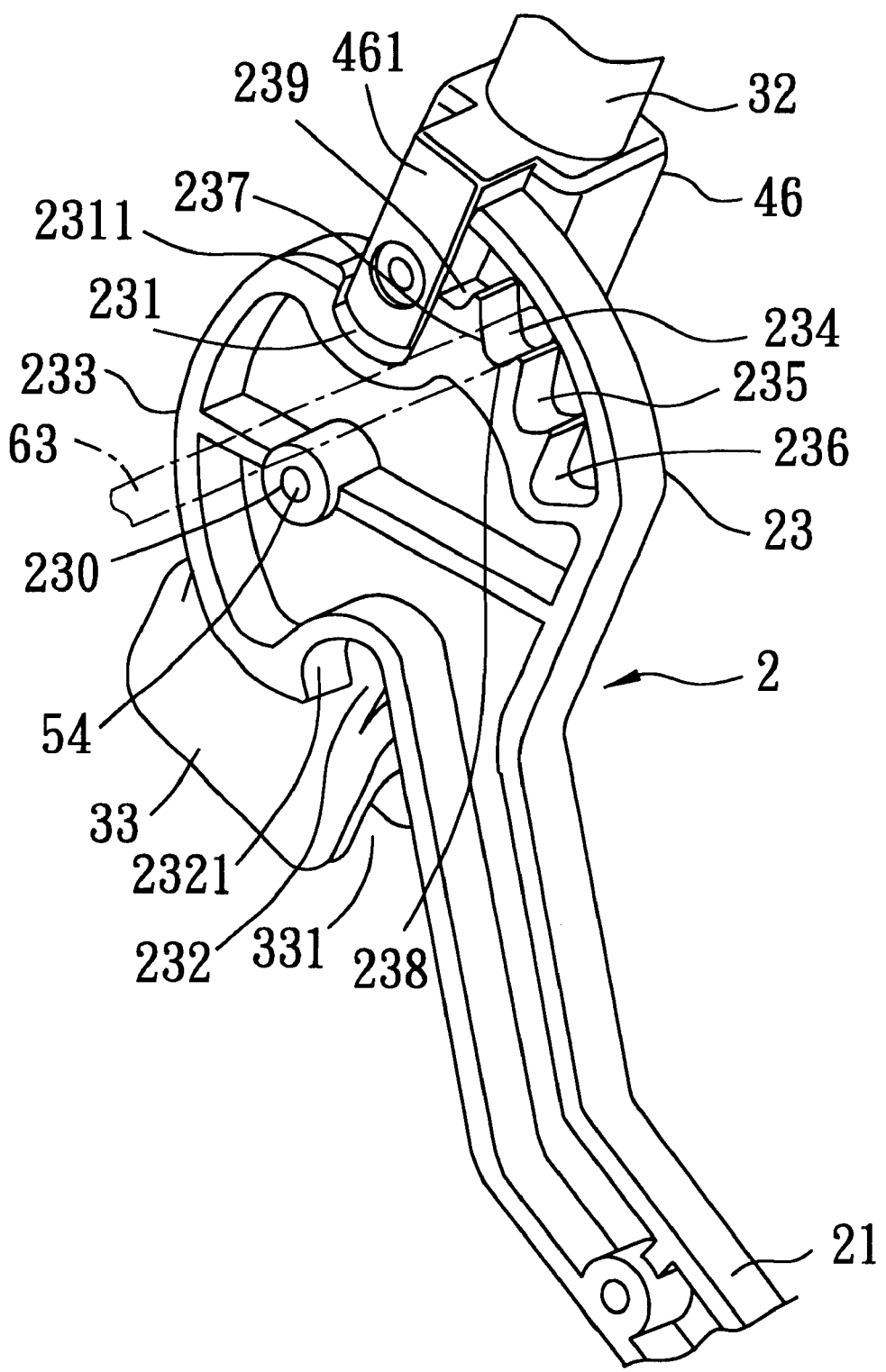
FIG. 3 is a perspective view illustrating a locking coupler when engaging a linking lever of the embodiment.

With reference to FIG. 3, each of two linking levers 2 has a fulcrum 21 which is pivoted to the mounting portion 143 by a pivot pin 25 about a third axis parallel to the second axis, a weight end 22 which is pivoted to the middle support portion 124 by a pivot pin 24, and an enlarged coupling joint 23 which is disposed at the opposite side of the fulcrum 21. The coupling joint 23 is turned about the third axis to move closer to the rearmost end 144 when the stroller is transformed from the unfolded position to the folded position. The coupling joint 23 includes a pivoted area 230, upper and lower barrier walls 2311,2321 extending in the axial direction and on the opposite sides of the pivoted area 230 in the transverse direction to form two barrier grooves 231,232, respectively, and an arcuate guiding wall 233 to form a guiding path which extends between the upper and lower barrier walls 2311,2321 and which is disposed forwardly of the pivoted area 230. In addition, the coupling joint 23 has an opening wall 239 and a plurality of engaging groove walls 234,235,236 which are disposed rearwardly of the upper barrier wall 2311 and which are angularly displaced from one another about a fourth axis parallel to the third axis. Each engaging groove wall 234,235,236 includes an inclining wall portion 237 facing rearwardly and extending upwardly to terminate at an upper edge, and a barrier wall portion 238 disposed rearwardly of and spaced apart from the inclining wall portion 237.

The handle frame 3 includes a handgrip rod 31, and a pair of tubular handle rods 32 extending from two ends of the handgrip rod 31. Each handle rod 32 includes a rider end 33 with a rider groove 331 which is disposed to rest on the middle support portion 124 when the stroller is in the unfolded position, an anchoring segment 35 which extends from the rider end 33 upwardly and which is pivotally mounted on the pivoted area 230 by a pivot pin 54 about the fourth axis, a lower arm 36 which extends from the anchoring segment 35 upwardly, and an upper arm 37 which extends from the lower arm 36 and distal to the anchoring segment 35.

Figure 4:
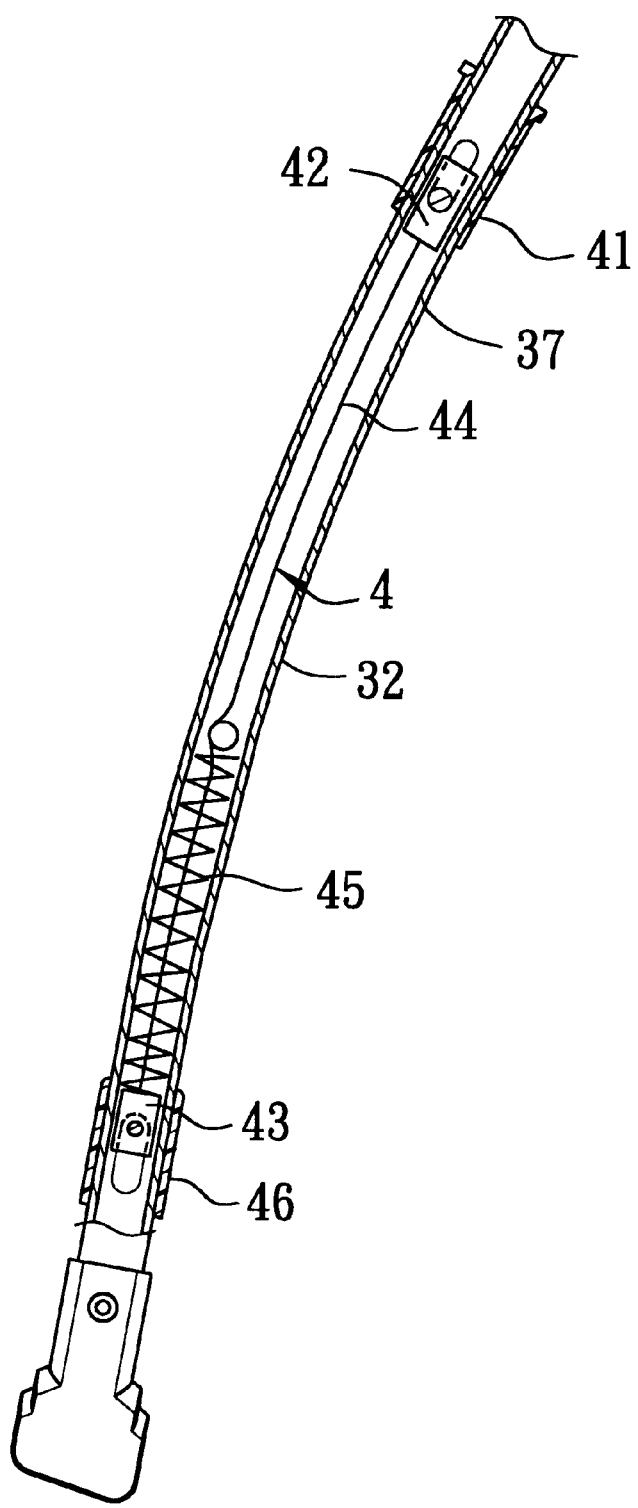
FIG. 4 is a fragmentary sectional view showing a positional relationship between a handle rod and a locking coupler of the embodiment.
Figure 9:
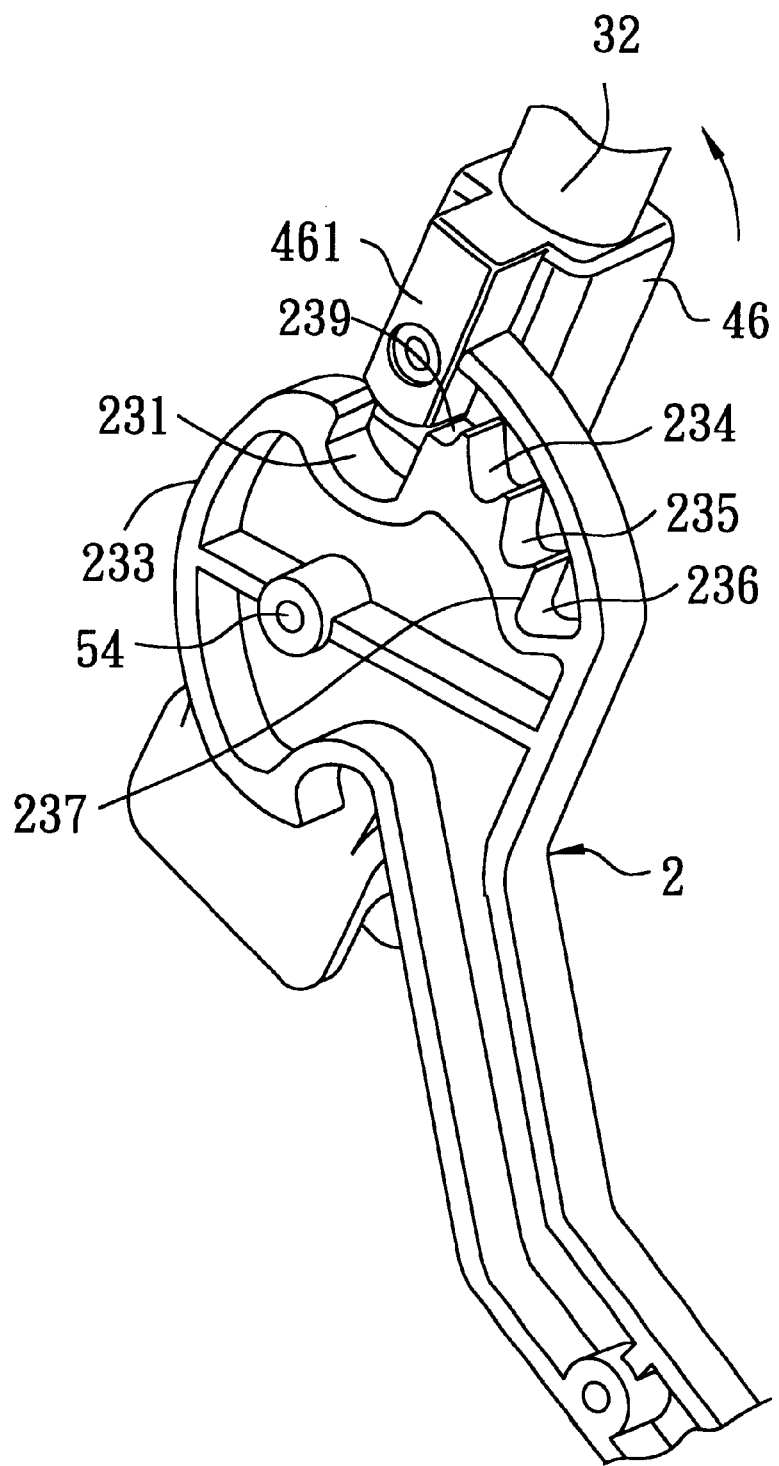
FIG. 9 is a perspective view showing the locking coupler in a released position.
Figure 11:
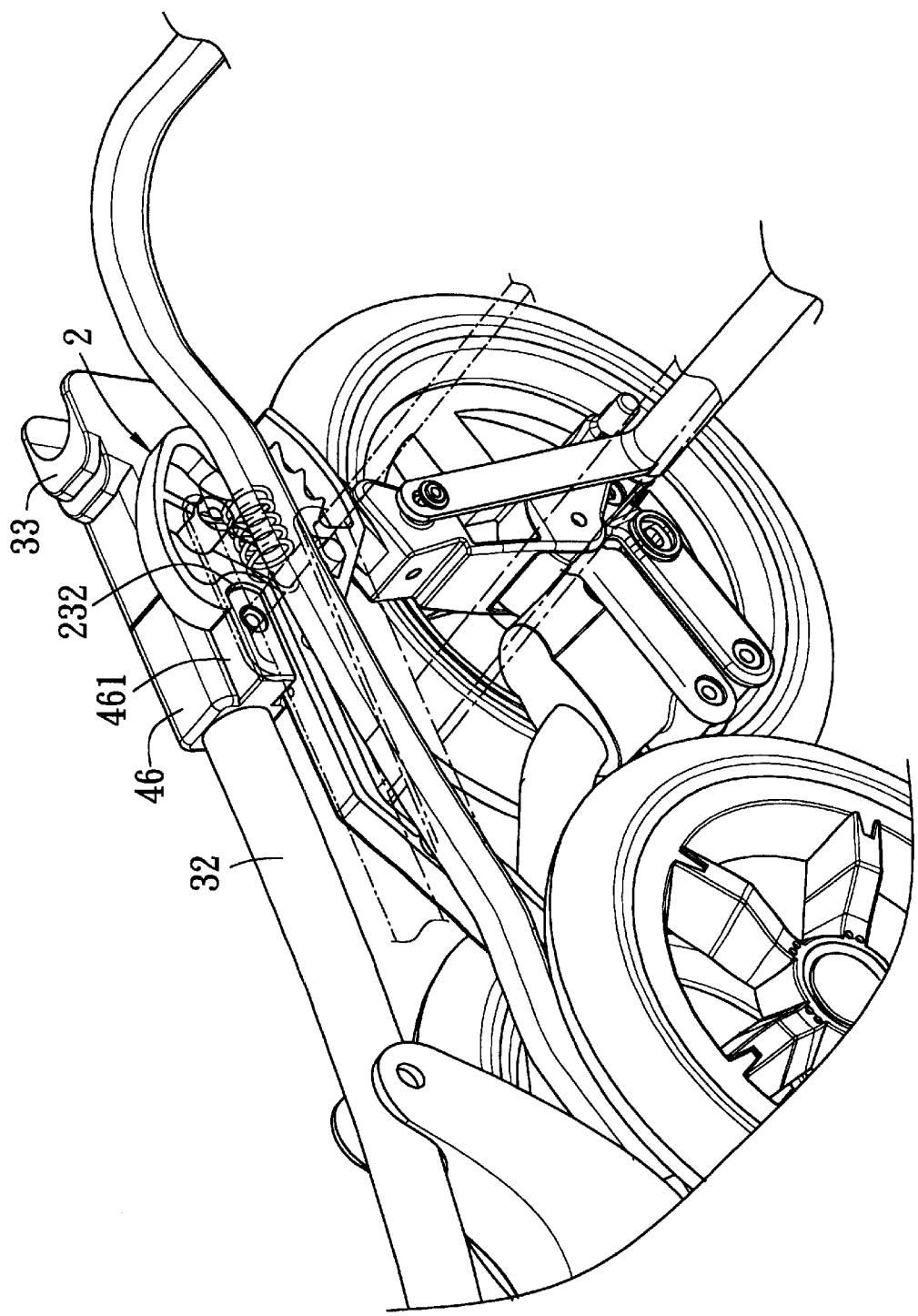
FIG. 11 is a fragmentary perspective view of the embodiment when folded.

With reference to FIGS. 3 and 4, a locking coupler 46 is sleeved movably on the lower arm 36 of each handle rod 32. Each locking coupler 46 is provided with a locking portion 461, and is movable relative to the respective lower arm 36 between a locked position, where the locking coupler 46 is closer to the anchoring segment 35, and the locking portion 461 is inserted into the upper barrier groove 231 so as to be hindered by the upper barrier wall 2311 from moving forwards, thereby preventing turning of the upper and lower arms 37,36 about the fourth axis, and a released position, as shown in FIG. 9, where the locking coupler 46 is remote from the anchoring segment 35, and the locking port ion 461 is disengaged from the upper barrier groove 231, thereby permitting the turning of the upper and lower arms 37,36 to be closer to the front securing end 121. In this state, the locking portion 461 can be moved downward along the guiding wall 233 so as to slip in the lower barrier wall 232 and be retained with the lower barrier wall 2321, thereby maintaining the stroller in the folded position, as shown in FIG. 11.

With reference to FIG. 4, each of two actuators 4 includes a runner 41 which is slidably sleeved on the respective upper arm 37, and a steel cord 44 with two ends which are connected to upper and lower connecting blocks 42,43 that are received slidably in the upper and lower arms 37,36. The upper and lower connecting blocks 42,43 are connected to the runner 41 and the locking coupler 46. Thus, upward movement of the runner 41 can actuate the respective locking coupler 46 to move away from the anchoring segment 35 so as to place the locking coupler 46 in the released position. A biasing member 45, such as a biasing spring, is disposed in each handle rod 32 to bias the respective locking coupler 46 to move downwardly toward the anchoring segment 35.

Referring again to FIGS. 1 and 2, the guarding rail 13 includes a front rail portion 131 which extends in an axial direction and which is supported by the rest ends 116 of the stumps 113, and left and right side rail portions 132 which extend rearwardly from the front rail portion 113 to terminate at left and right pivoted ends 133, respectively. Each of the left and right pivoted ends 133 is pivotally connected to the respective lower arm 36 by a pivot pin 34 about a fifth axis parallel to the fourth axis and proximate to the respective upper arm 37.

Figure 5:
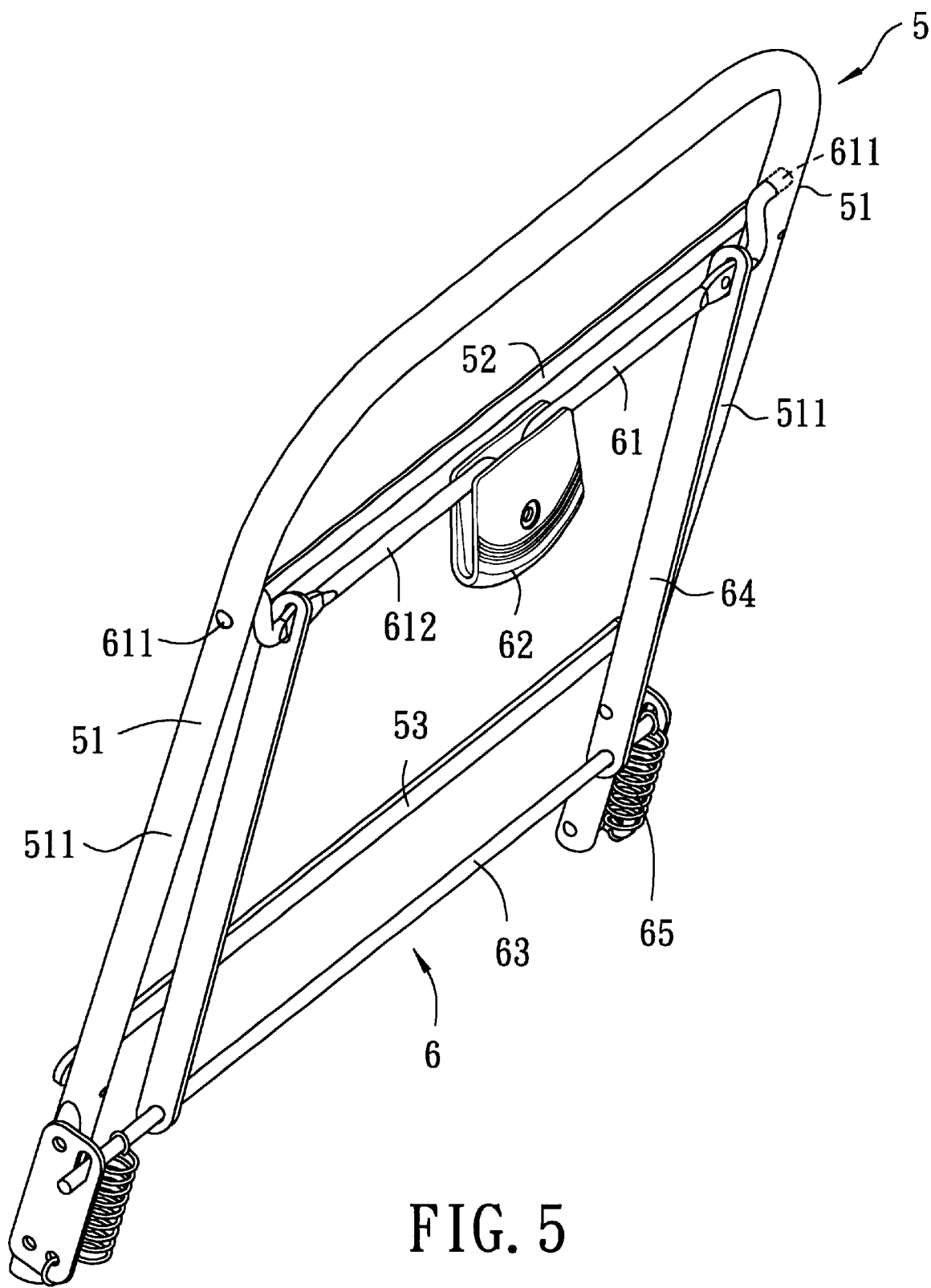
FIG. 5 is a perspective view showing a backrest frame and a position locking mechanism of the embodiment.
Figure 6:
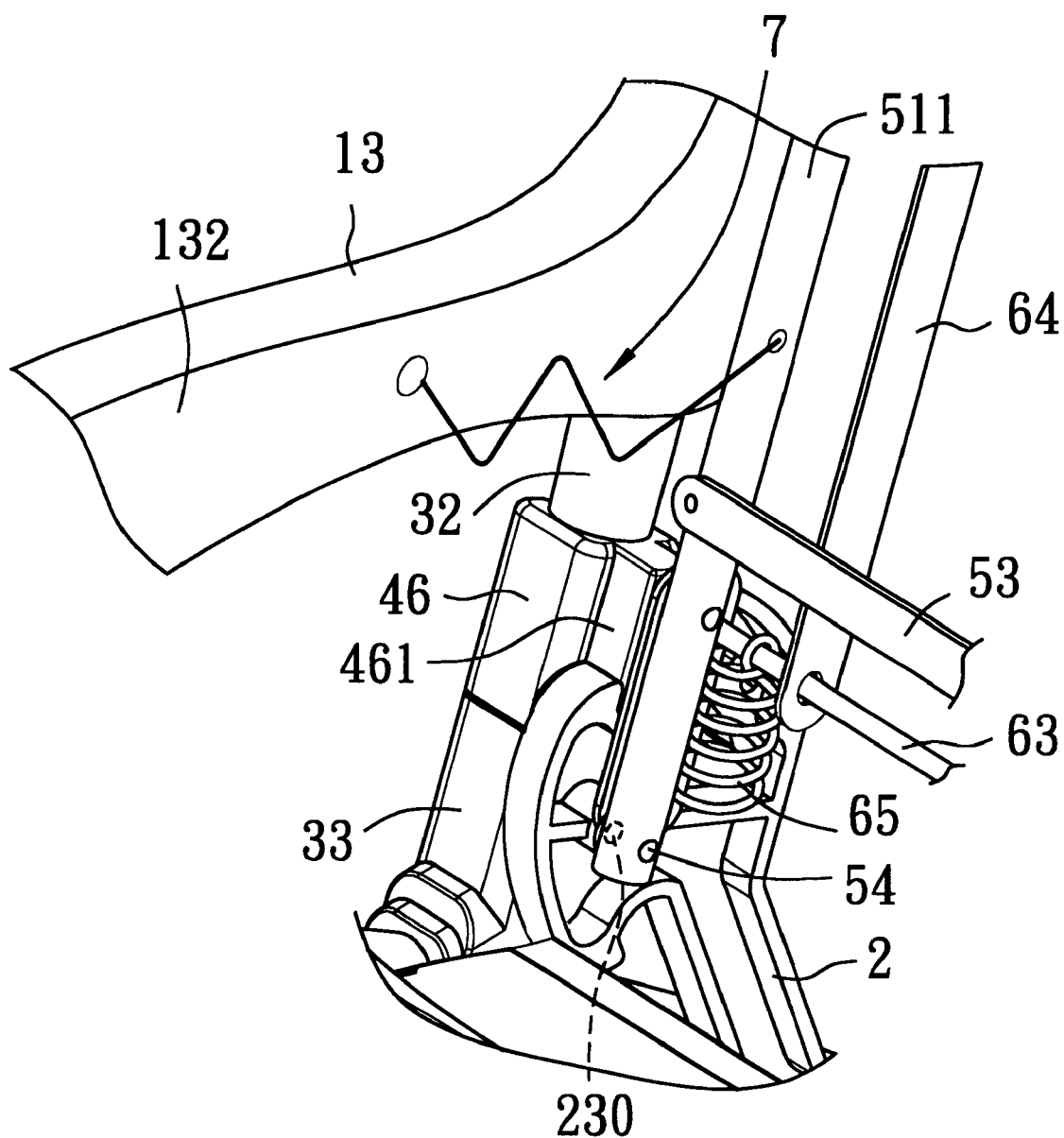
FIG. 6 is an enlarged perspective view of a portion of the embodiment shown in FIG. 1.
Figure 7:
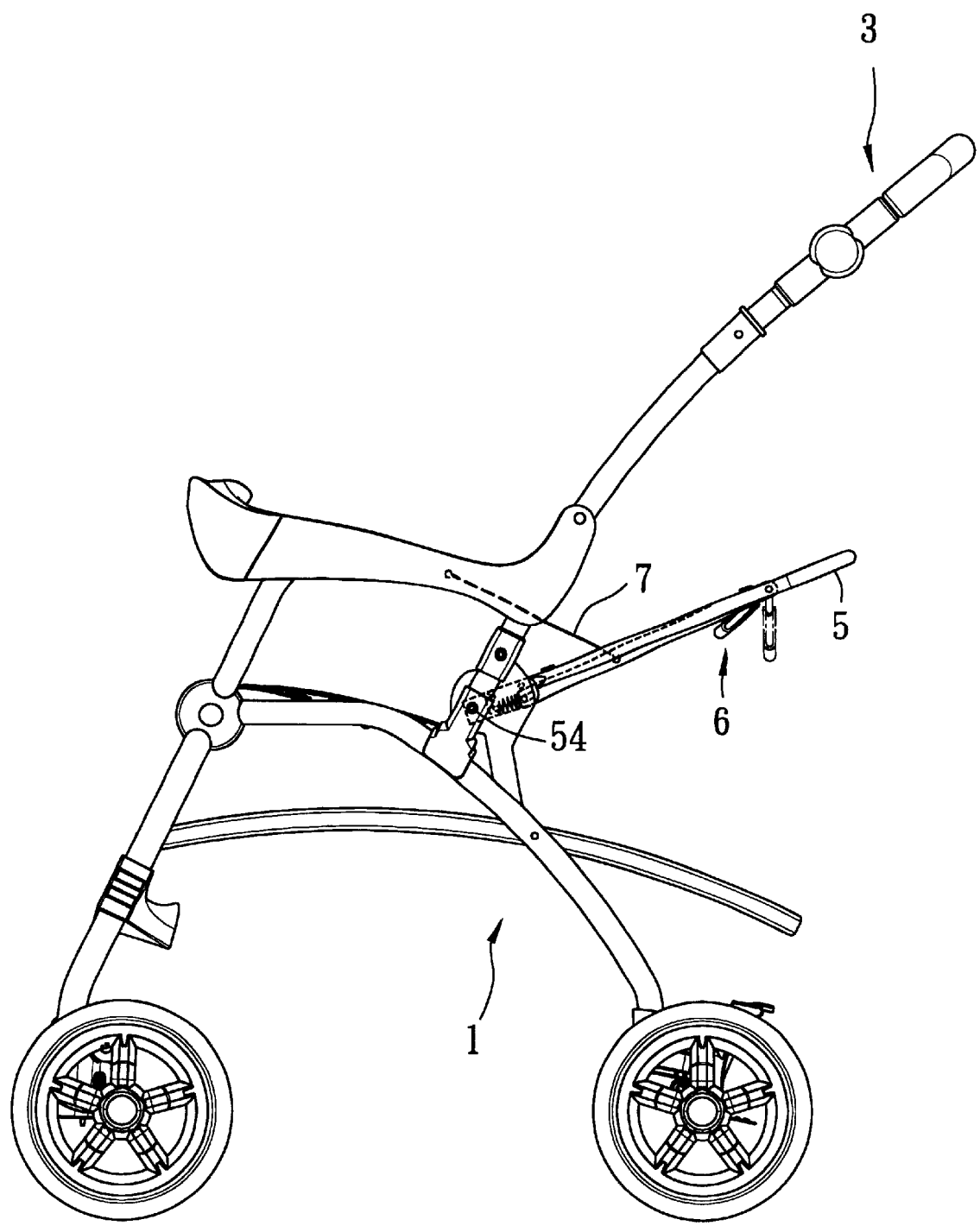
FIG. 7 is a side view of the embodiment showing the backrest frame in a rear inclined position.

With reference to FIGS. 1, 5 and 6, the backrest frame 5 includes a pair of stiles 51 which are spaced apart from each other in the axial direction and which are respectively inboard to the handle rods 32. Each stile 51 includes a lower stile end which is pivotally mounted to the pivoted area 230 of the respective coupling joint 23 by the pivot pin 54 so as to be turnable about the fourth axis, an upper stile end opposite to the lower stile end, and an intermediate stile segment 511 interposed between the upper and lower stile ends. Upper and lower connecting rods 52,53 are disposed across the stiles 51. The position locking mechanism 6 includes a positioning rod 63 which extends in the axial direction and which is connected to the intermediate stile segments 511. The positioning rod 63 is movable in the transverse direction between an engaging position to engage a selected one of the engaging groove walls 234,235,236 so as to be hindered from rearward movement by the barrier wall portion 238, as shown in FIG. 3, and a disengaging position to disengage from the engaging groove walls 234, 235,236 so as to permit turning of the stiles 51 about the fourth axis. FIG. 7 shows a rear inclined state where the positioning rod 63 engages the rear engaging groove wall 236. A releasing member includes a rotary rod 61 which is connected pivotally to the upper stile ends of the stiles 51 at two pivot ends 611 and which is connected to the positioning rod 63 by two connecting portions 64, and an actuating block 62 which is secured to an intermediate segment 612 of the rotary rod 61. Thus, rotation of the rotary rod 61 by lifting of the actuating block 62 can lift the positioning rod 63 to the disengaging position. Two biasing springs 65 are disposed to pull the positioning rod 63 back to the engaging position.

With reference to FIG. 6, each of two holding members 7, such as two pulling cords in this embodiment, has first and second connected ends respectively secured to a respective one of the left and right side rail portions 132 and the corresponding intermediate stile segment 511.

Figure 8:
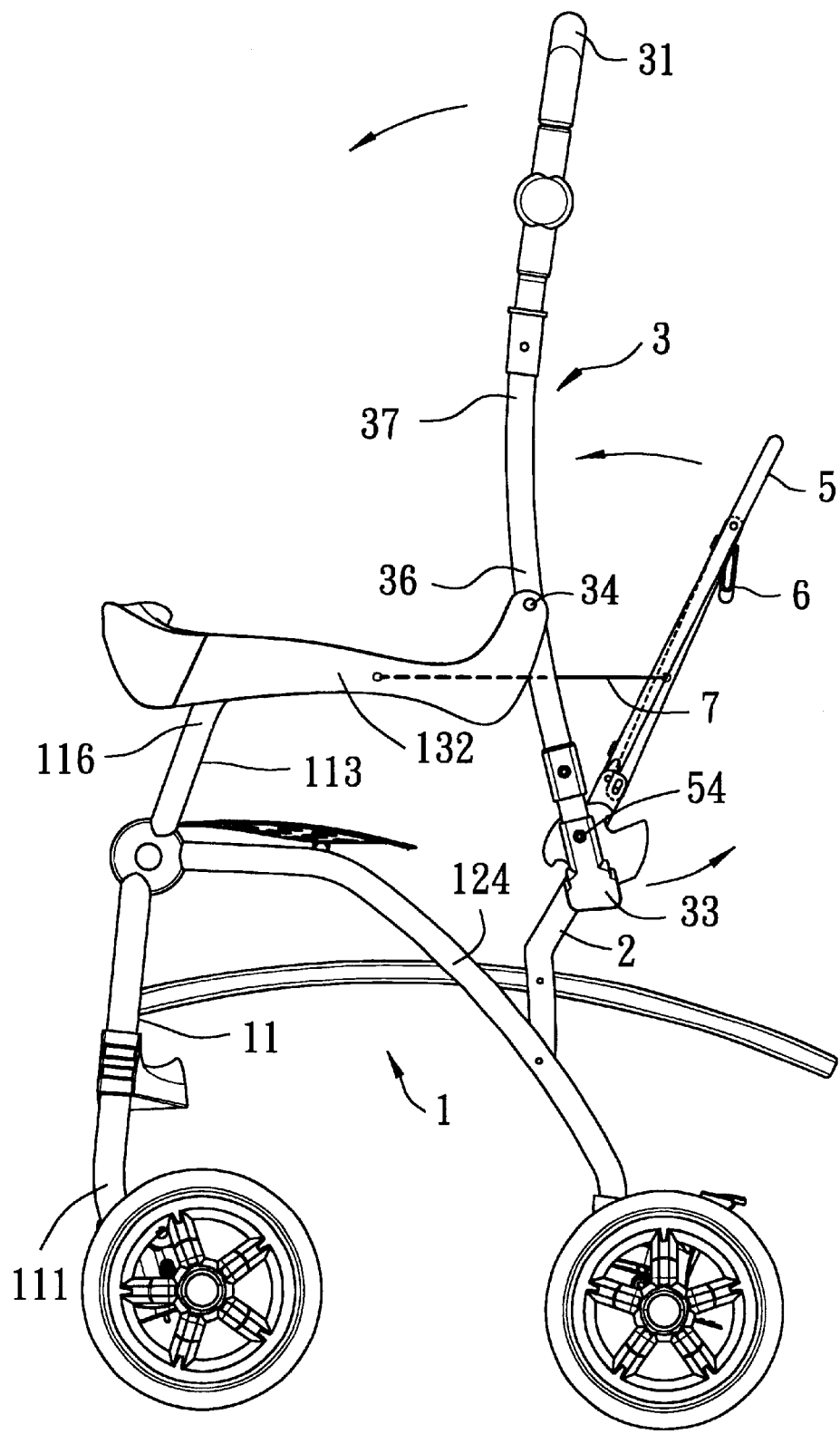
FIG. 8 is a side view to illustrate folding of the embodiment.

As illustrated, as shown in FIGS. 8 and 9, to fold the stroller of the embodiment, the upper and lower arms 37, 36 are pushed forward and are turned about the fourth axis while the locking couplers 46 are in the released position. The pivoting movements of the lower arms 36 and the stumps 113 about the fourth and second axes respectively result in downward movements of the left and right side rail portions 132, and induce a jerk force to tense the holding members 7, as shown in FIG. 8. The positioning rod 63 can be dragged forwardly to flip over the upper edges of the engaging groove walls 236,235,234 to disengage the linking levers 2 from the openings 239.

Figure 10:
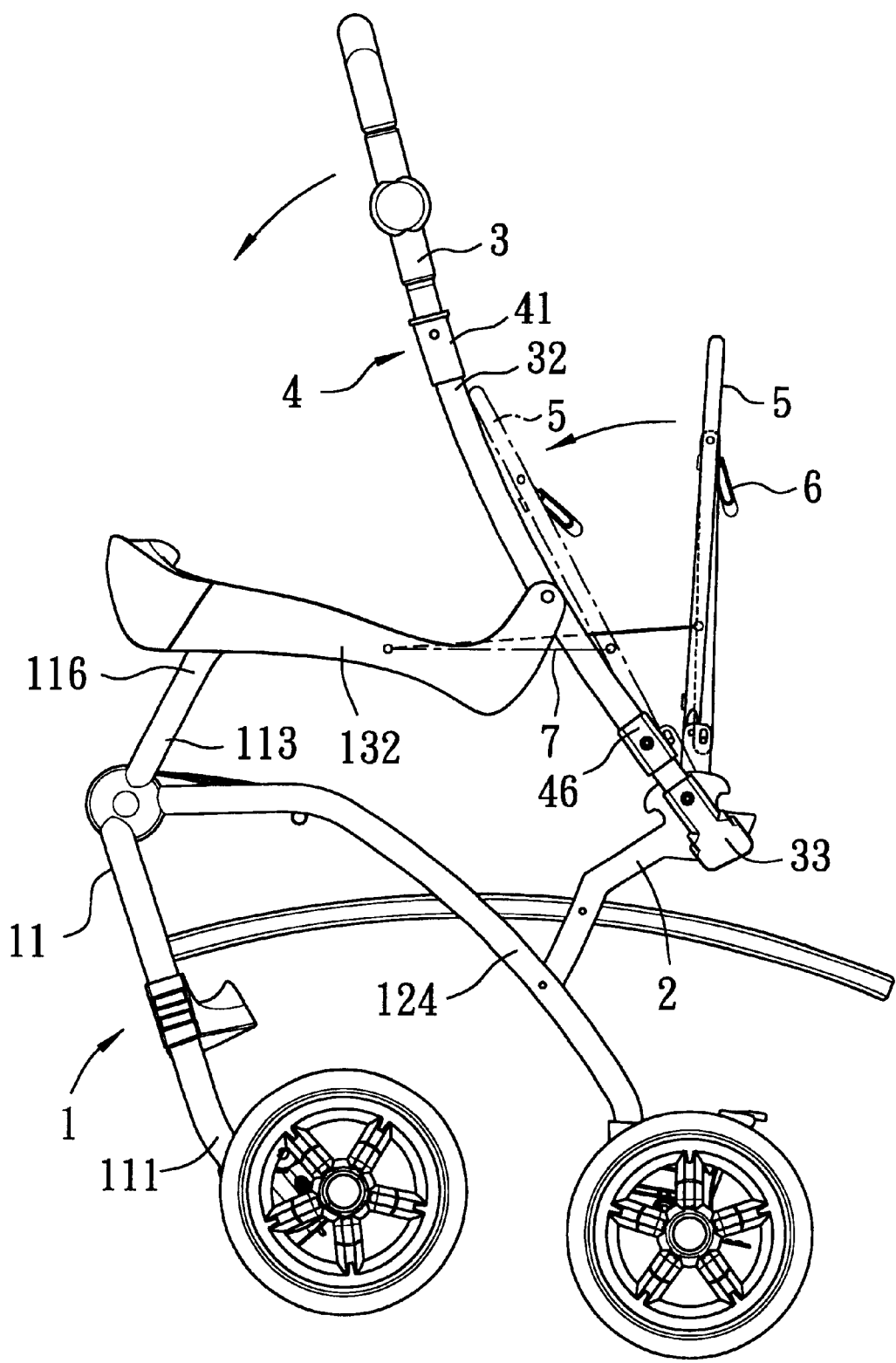
FIG. 10 is a side view to illustrate how the embodiment is further folded.
Figure 12:
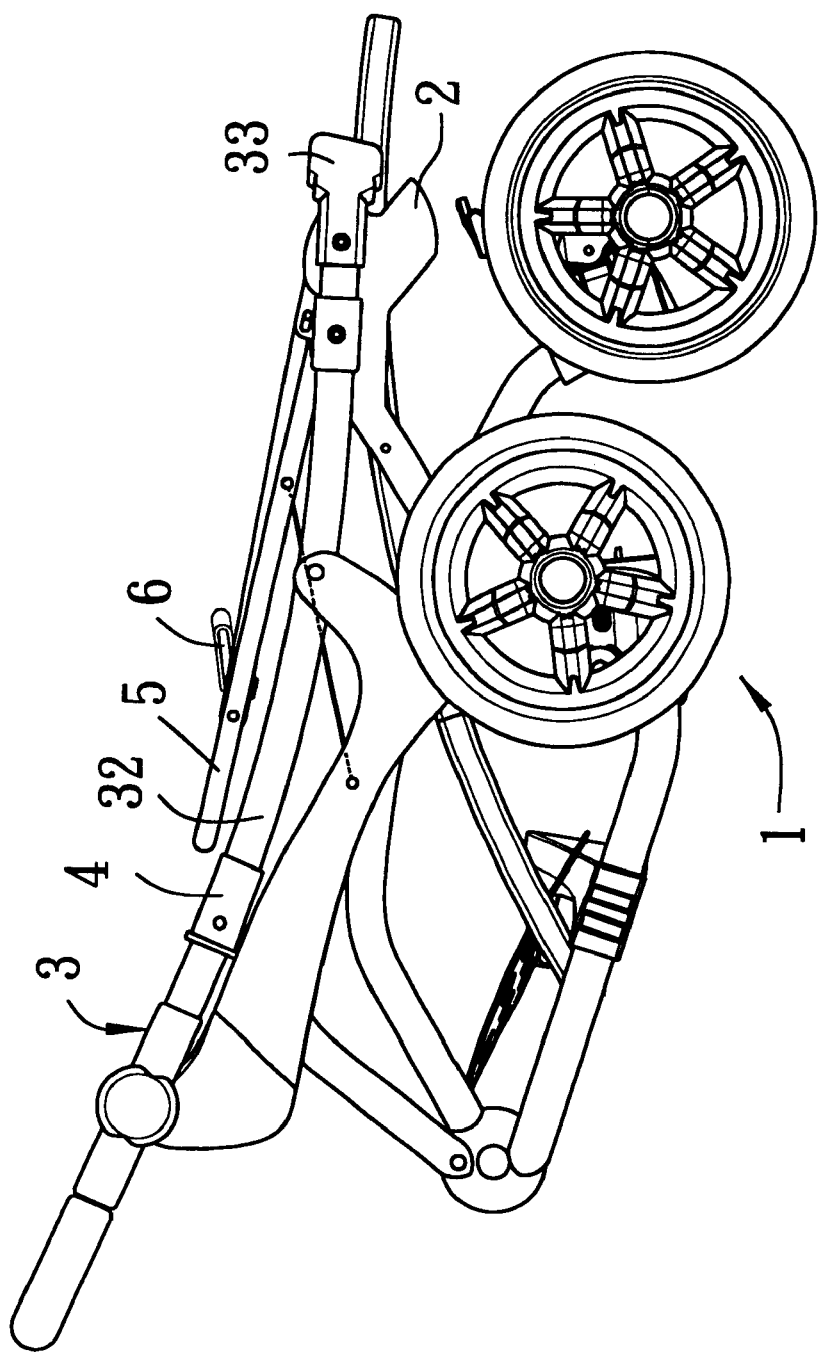
FIG. 12 is a side view of the embodiment when folded.

Then, as shown in FIGS. 10 to 12, the upper and lower arms 37,36 are further pushed forward. The upper stile ends of the stiles 51 are brought to turn about the fourth axis and to fall down together with the upper arms 37 by virtue of gravity. Finally, the locking portions 461 of the locking couplers 46 are slipped and retained in the lower barrier groove 232 to maintain the stroller in the folded position.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:
1. A foldable stroller comprising:
   a pair of front wheels;
   a pair of rear wheels;
   a pair of front legs disposed to be spaced apart from each other in an axial direction, each of said front legs including a front lower end disposed to carry a respective one of said front wheels, a front upper end opposite to said front lower end in a transverse direction transverse to the axial direction, and an intermediate portion interposed therebetween;
   a pair of suspending rods spaced apart from each other in the axial direction, each of said suspending rods having a front securing end pivotally mounted to a respective one of said front upper ends about a first axis, and a middle support portion extending from said front securing end rearward and downwardly and terminating at a rear holding end which carries a respective one of said rear wheels;
   a pair of stumps, each including a connected end pivotally mounted to a respective one of said front securing ends about a second axis parallel to the first axis, and an upright portion extending from said connected end in the transverse direction and uprightly and terminating at a rest end, such that a respective one of said front legs and a respective one of said stumps are turnable about the first and second axes respectively to transform said stroller between a folded position, where both said front lower end and said rest end are closer to said middle support portion, and an unfolded position, where said front lower end and said rest end are remote from said middle support portion;
   a pair of mounting bars, each including an anchoring end connected to a respective one of said intermediate portions, and a mount portion extending rearward from said anchoring end and terminating at a rearmost end;
   a pair of linking levers, each having a fulcrum pivoted to said mounting portion about a third axis parallel to the second axis, a weight end pivoted to a respective one of said middle support portions, and a coupling joint disposed at the opposite side of said fulcrum, such that said coupling joint is turned about the third axis to move closer to said rearmost end when said foldable stroller is transformed from the unfolded position to the folded position, said coupling joint including
   a pivoted area,
   upper and lower barrier walls disposed to extend in the axial direction and on the opposite sides of said pivoted area in the transverse direction, and
   a guiding path extending between said upper and lower barrier walls and disposed forwardly of said pivoted area;
   a pair of handle rods, each including a rider end disposed to rest on said middle support portion when said stroller is in the unfolded position, an anchoring segment which extends from said rider end upwardly and which is pivotally mounted on said pivoted area about a fourth axis that is parallel to the third axis, a lower arm extending from said anchoring segment upwardly, and an upper arm extending from said lower arm and distal to said anchoring segment;
   a pair of locking couplers, each provided with a locking portion, and disposed to be movable relative to said lower arm between a locked position, where a respective one of said locking couplers is closer to said anchoring segment, and said locking portion is hindered by said upper barrier wall from moving forward, thereby preventing turning of said upper and lower arms about the fourth axis, and a released position, where the respective one of said locking couplers is remote from said anchoring segment, and said locking portion is disengaged from said upper barrier wall, thereby permitting the turning of said upper and lower arms to be closer to said front securing end;

a pair of actuators, each disposed to actuate a respective one of said locking couplers to move away from said anchoring segment so as to place the respective one of said locking couplers in the released position;

a pair of biasing members, each disposed to bias a respective one of said locking couplers to move towards said anchoring segment;

a guarding rail including left and right side rail portions which have front ends that are supported by said rest ends, and rear ends that extend rearwardly from said front ends and that terminate at left and right pivoted ends, respectively, each of said left and right pivoted ends being pivotally connected to a respective one of said lower arms about a fifth axis parallel to the fourth axis and proximate to a respective one of said upper arms;

a backrest frame including a pair of stiles which are spaced apart from each other in the axial direction and which are respectively inboard to said handle rods, each of said stiles including a lower stile end pivotally mounted to said pivoted area and turnable about the fourth axis, an upper stile end opposite to said lower stile end, and an intermediate stile segment interposed between said upper and lower stile ends; and a holding member having first and second connected ends respectively secured to one of a respective one of said stumps and said guarding rail, and a respective one of said intermediate stile segments, such that, when said upper and lower arms are pushed forward and are turned about the fourth axis while said locking couplers are in the released position, downward movement of a respective one of said left and right side rail portions, which arises as a result of pivoting movements of said lower arms and said stumps about the fourth and second axes respectively, induces a jerk force to said holding member, thereby bringing said upper stile end to turn about the fourth axis and to fall down together with said upper arm by virtue of gravity.

2. The foldable stroller of claim 1, wherein said coupling joint of each of said linking levers further includes a plurality of engaging groove walls disposed rearwardly of said upper barrier wall and angularly displaced from each other about the fourth axis, said stroller further comprising a positioning rod extending in the axial direction and connected to said intermediate stile segment, said positioning rod being movable in the transverse direction between an engaging position to engage a selected one of said engaging groove walls so as to position said backrest frame relative to said coupling joint, and a disengaging position to disengage from said engaging groove walls so as to permit said backrest frame to turn about the fourth axis.

3. The foldable stroller of claim 2, wherein each of said engaging groove walls includes an inclining wall portion facing rearwardly and extending upwardly to terminate at an upper edge, such that when the jerk force is applied to said holding member, said positioning rod will be dragged forwardly to flip over said upper edge, and a barrier wall portion disposed rearwardly of and spaced apart from said inclining wall portion to hinder rearward movement of said positioning rod.

4. The foldable stroller of claim 3, wherein said locking portion of each of said locking couplers, when in the released position, is movable downwards along said guiding path so as to slip in and be retained with said lower barrier wall, thereby maintaining said stroller in the folded position.

5. The foldable stroller of claim 2, further comprising a releasing member disposed to actuate lifting of said positioning rod to the disengaging position, and a biasing spring disposed to pull said positioning rod back to the engaging position.

6. The foldable stroller of claim 1, wherein each of said actuators includes a runner sleeved slidably on said upper arm, and a cord extending along said upper and lower arms and coupled to said runner and said locking portion, such that upward movement of said runner against the biasing action of a respective one of said biasing members can place said locking portion in the released position.

* * * * *